July 28, 1953 H. E. SWARTOUT 2,646,736
SOIL CONDITIONING MACHINE
Filed June 28, 1948 2 Sheets-Sheet 1
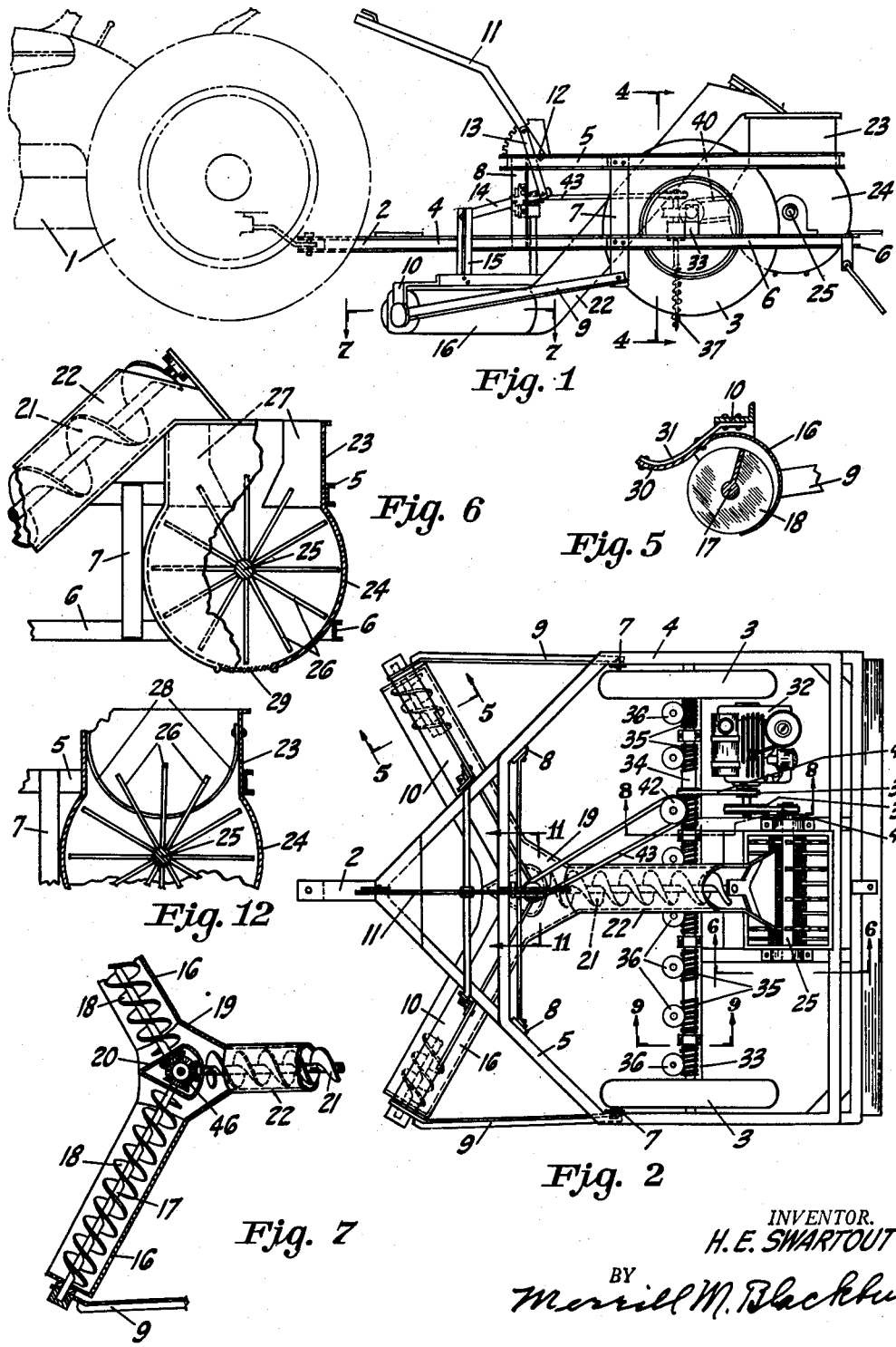
INVENTOR.
H. E. SWARTOUT
BY
Merrill M. Blackburn
ATTORNEY July 28, 1953  H. E. SWARTOUT  2,646,736
SOIL CONDITIONING MACHINE
Filed June 28, 1948  2 Sheets-Sheet 2

INVENTOR.
H. E. SWARTOUT
BY
Merrill M. Blackburn
ATTORNEY

Patented July 28, 1953

2,646,736

UNITED STATES PATENT OFFICE 2,646,736

SOIL CONDITIONING MACHINE

Harold E. Swartout, Davenport, Iowa

Application June 28, 1948, Serial No. 35,548

6 Claims. (Cl. 97—10)

My present invention relates to argricultural machinery and more particularly to a machine for breaking up clods of earth and pulverizing vegetable matter. Among the objects of this invention are the provision of a machine which will gather up soil and vegetable matter and convert same into a fine condition and then re-distribute the resulting product over the surface of the ground; the provision of a machine having a pulverizing hopper, means for picking up soil and vegetation, and means for conveying such soil and vegetation into the hopper to be pulverized; the provision of a machine of the character indicated having a number of furrow-forming augers which can be extended below the surface of the earth to form, in the sub-soil, water-drainage channels to carry away excess water in times of a surplus of rain; and such further objects, advantages, and capabilities as will hereafter appear and as are inherent in the construction disclosed herein. My invention further resides in the combination, constructon, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 is a side elevation of a structure embodying my present invention, with a part of a traction unit shown attached to the front end thereof;

Fig. 2 is a plan view of a structure embodying my present invention;

Fig. 5 represents a transverse section substantially along the plane indicated by the line 5—5, Fig. 2;

Fig. 6 is a fragmentary side elevation, partly in section and partly broken away, looking in the direction of the arrows 6—6, Fig. 2;

Fig. 7 represents a fragmentary horizontal section substantially along the plane indicated by the line 7—7, Fig. 1;

Fig. 12 represents a fragmentary section through the pulverizer of the machine, showing a modified form of this construction.

Figure 3:
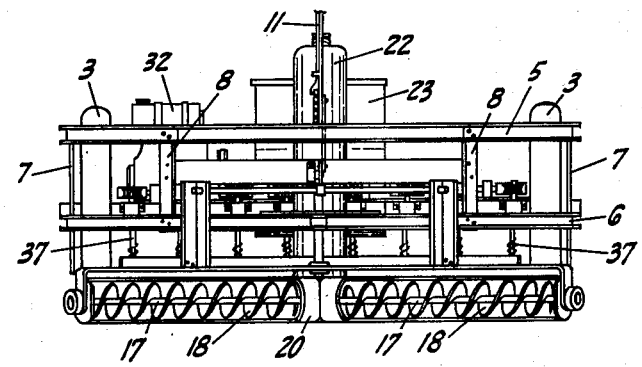
Fig. 3 is a front elevation of this structure.
Figure 4:
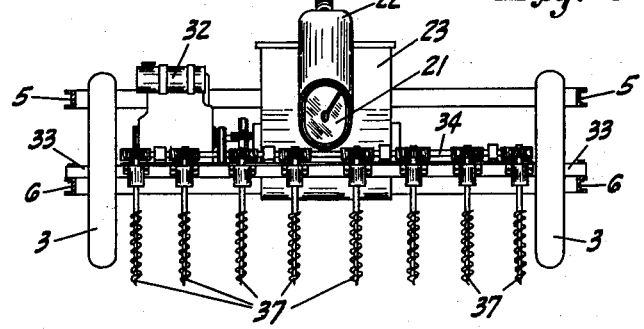
Fig. 4 represents a vertical transverse section substantially along the plane indicated by the line 4—4, Fig. 1.
Figures 8, 9, 10:
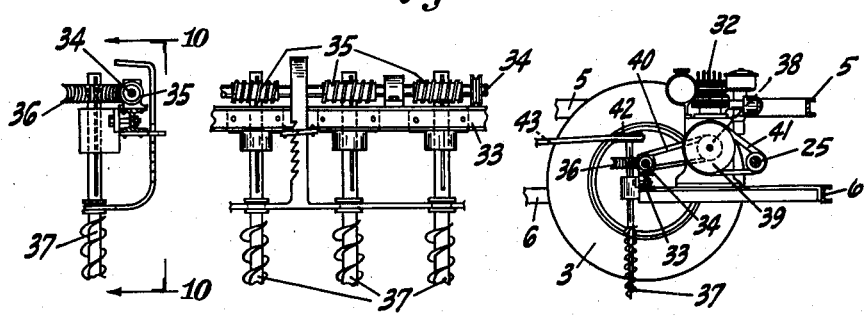
Fig. 8 represents a vertical section substantially along the broken plane indicated by the line 8—8, Fig. 2.
Fig. 9 represents a section substantially along the plane indicated by the line 9—9, Fig. 2.
Fig. 10 represents a fragmentary elevation of a part of the structure, looking in the direction of the arrows 10—10, Fig. 9.

Reference will now be made in greater detail to the annexed drawings for a more complete description of this invention. The traction unit for drawing the mechanism constituting the subject matter of my invention is indicated, in general, by the numeral 1 in Fig. 1. This traction unit is hitched to the tongue 2 of the drawn unit, which comprises, in part, a pair of supporting wheels 3 and a supporting frame 4. This supporting frame 4 comprises the upper frame 5 and the lower frame 6 which are connected by uprights 7 and 8 which hold the frames 5 and 6 relatively stationary with relation to each other. The uprights 7, connected to the frames 5 and 6 by any suitable means, such as spot welding, bolts, or rivets, extend below the frame members 6, as shown in Fig. 1, and are pivotally connected to one end of braces 9, the other end of each of which is connected to a frame 10.

A hand lever 11 is pivotally connected, as shown at 12, to the frame 5, and is connected through link 13, lever 14, and link 15 to the frame 10. As the lever 11 is pushed forwardly and downwardly, the rear end of lever 14 is pushed downwardly and its forward end is raised, thus causing raising of the frame 10 and the housing 16 to which it is connected. Inside of the housing 16 is a shaft 17 which forms the core of a screw type excavator 18. This screw type excavator is located in the housing 16. As shown in Fig. 7, two of these housings 16, arranged at a substantial angle to each other, are united into a common housing 19, within which is arranged a gear housing 20. Within this housing 20 are a plurality of beveled gears which connect in operative relation the screw type excavators 18 and a screw conveyor 21, located in the casing 22, extending diagonally upwardly from the housing 19 and opening into the upper end of the hopper 23, as shown most clearly in Fig. 6. This hopper 23 opens directly into a pulverizing casing 24 in which is mounted a rotatable shaft 25. From this shaft radiate blades 26 which are for pulverizing the dirt and vegetation which is emptied into the hoppper 23 from the auger casing 22.

The form of pulverizers shown in Figs. 6 and 12 differs somewhat in that, in the former, are plates 27, between which the pulverizer blades or arms 26 pass when being carried around by the shaft 25, which rotates at a high rate of speed. This unit serves as a hammermill for the breaking up and tearing apart of the materials gathered up by the screw type excavator blades 18 and fed by the screw conveyor 21 into the hopper 23. As shown at 29, in Fig. 6, the casing 24 has an opening in the bottom which is covered by a screen intended to sift the pulverized material so that only such as has been finely pulverized will be returned to the surface of the field.

The structure of Fig. 12 differs from that of Fig. 6, described above, in that the plates 27 are replaced by arcuate bands 28 connected to opposite sides of the hopper 23 in any suitable manner, as by being riveted or spot welded thereto. The blades or arms 26 pass between these bands 28, which are somewhat less in width than the space between the arms 26, thereby allowing free travel of the arms between the bands.

As shown at 30, in Fig. 5, the upper portion of the housing 16 extends forwardly and upwardly to form a hood between which and the screw type excavator 18 clods of earth and other matter may be gathered to be pushed laterally into the housing 19, and from this into the casing 22. A bracket 31 is connected to the frame member 10 and extends downwardly and forwardly parallel to the hood 30, to which it is secured and for which it serves as a support.

A motor 32 is carried in any suitable manner by the frame of the machine, such as by resting upon cross-frame members extending between the axle 33 and the frame member 6. The axle 33 can be seen in Fig. 2 just below the shaft 34 and and can also be seen in end view in Fig. 1. This arrangement of parts is not vital; hence, obviously, other arrangements may be made without disturbing the functioning of the apparatus. A plurality of worms 35 are mounted upon the shaft 34 and cooperate with worm gears 36 connected to augers 37.

Upon the shaft of the motor 32 are mounted a pair of belt pulleys 38 and 39 which are connected by belts 40 and 41 to cooperating belt pulleys on the shafts 34 and 25, respectively. It will be seen from this that, when the motor 32 operates, the pulverizer shaft 25 and the worm shaft 34 will be rotated, causing the pulverizer to beat up anything, such as clods of earth or vegetation, into material fine enough to pass through the screen 29. Rotation of the shaft 34, as stated above, causes rotation of the worm gears 36 and the shafts of augers 37, upon which they are mounted.

Figure 11:
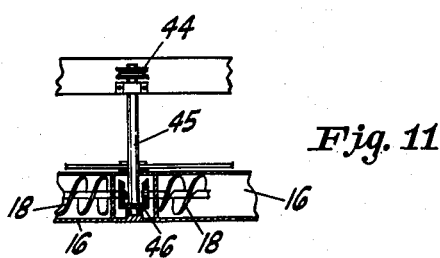
Fig. 11 represents a fragmentary transverse section substantially along the plane indicated by the line 11—11, Fig. 2.

On a shaft of one of the augers 37 is a belt pulley 42 over which passes a belt 43 which is looped around a belt pulley 44, connected in driving relation to the shaft 45, as shown in Fig. 11, for the purpose of driving the beveled gear 46 which drives the shafts 17 of screw type excavators 18. As indicated above, these screw type excavators carry dirt and vegetable matter to the housing 19 and from this to the screw conveyor 21 which conveys it to the hopper 23 where it is pulverized and then distributed on the surface of the field.

The augers 37 reach down into the top soil and, if this be shallow, they may reach into the subsoil and form grooves therein which will serve as conveying means for carrying off excessive moisture in times of heavy rains.

It is of course understood that the specific description of structure set forth above may be departed from without departing from the spirit of this invention as disclosed herein and as defined in the appended claims.

Having now described my invention, I claim:

1. An agricultural machine comprising a framework for attachment to a tractor unit, wheels for supporting the framework at an approximately fixed distance above the earth's surface, casings open on the forward side and having screw type excavators therein, said casings being arranged at a substantial angle with relation to each other in a substantially horizontal plane, a third casing rising at a substantial inclination from the junction of the first casing, a screw conveyor rotating in the third casing to feed dirt and vegetation upwardly, a hopper supported on the frame underneath the upper end of the third casing, rotatable pulverizing means on an axle rotating in said hopper, for the pulverizing of products dropped into said hopper by the screw conveyor in the third casing, said structure having wheels on opposite sides of the machine connected to the frame to support the same, a shaft extending transversely of the machine forwardly from the hopper, a frame member associated with said shaft, bearings carried by said frame member and supporting substantially vertical augers, driving means connecting the shaft and the screw type excavators to cause rotation of the latter, and driving means for causing rotation of the screw conveyors.

2. An agricultural machine comprising a framework for attachment to a traction unit, wheels for supporting the framework at an approximately fixed distance above the earth's surface, casings open on the forward side and having screw type excavators therein, said casings being arranged at a substantial angle with relation to each other in a substantially horizontal plane, a third casing rising at a substantial inclination from the junction of the first casings, a screw conveyor rotating in the third casing to feed dirt and vegetation upwardly, a hopper supported on the frame underneath the upper end of the third casing, a transverse frame member positioned forward of said hopper, a shaft carried by said frame member, a driven soil-working mechanism carried by said frame member below the latter and driven by said shaft, rotatable pulverizing means mounted on an axle rotating in said hopper, for the pulverizing of products dropped into said hopper by the screw conveyor in the third casing, unitary means for driving the rotatable axle in said hopper and said shaft, and means actuated by said shaft for driving said excavators and said screw conveyors.

3. A soil-conditioning machine comprising the combination of a supporting frame, soil and vegetation gathering means at the forward portion of said frame, a plurality of relatively narrow trench-forming means carried by said frame in laterally spaced apart relation transversely of said frame and rearwardly of said soil and vegetation gathering means, a pulverizer for soil and vegetation matter, a conveyor for conveying said material from said gathering means past said trench-forming means to said pulverizer, and means rearwardly of said trench-forming means for discharging the pulverized material upon the ground trenched by said trench-forming means.

4. In a soil-conditioning machine, a soil gathering unit comprising a laterally extending housing open at its forward portion, a conveyor auger therein, and a hood extending forwardly at the upper edge of said open side above and downwardly below the upper portions of said auger at the forward side thereof.

5. An agricultural machine comprising a framework for connection to a tractor unit, wheels for supporting the framework, casings open on the forward portion and having screw type conveyors therein, said casings and screw conveyors being arranged to feed soil and vegetation laterally inwardly, a rearwardly and upwardly extending casing joined in the central portion of the machine to said first mentioned casings and carrying screw conveyor means for delivering said soil and vegetation upwardly, a hopper carried by said framework underneath the upper end of said rearwardly extending casing, pulverizing means in said hopper, a shaft journaled in said framework below the upper end of said rearwardly and upwardly extending casing and forward of said hopper, a plurality of earth-working elements driven by said transverse shaft for working the ground traversed by said first mentioned casings, means for driving said shaft, and means actuated by said shaft for driving said screw conveyors.

6. In a soil conditioning machine, a supporting frame, having forwardly converging frame portions, a top soil and plant-gathering unit underneath the forwardly converging frame portions and comprising a substantially V-shaped housing arranged with its apical portion rearwardly and open at its forward portion, material-moving means in said housing, a hand lever pivotally connected with the approximately central portion of said frame, a link connected at its lower end with each leg of said V-shaped housing and extending upwardly therefrom, a cross-bar connected with the upper end of each of said links, a lever pivoted on said frame and connected at one end with said cross-bar, and means connecting the other end of said lever with said hand lever.

HAROLD E. SWARTOUT.

References Cited in the file of this patent

UNITED STATES PATENTS

| Number | Name | Date |
|---|---|---|
| 568,401 | Briggs | Sept. 29, 1896 |
| 947,252 | Nelson | Jan. 25, 1910 |
| 1,258,299 | Bayley | Mar. 5, 1918 |
| 1,676,646 | Funk | July 10, 1928 |
| 2,303,726 | Detloff | Dec. 1, 1942 |
| 2,347,664 | Chilton | May 2, 1944 |
| 2,369,293 | Gotzlinger | Feb. 13, 1945 |
| 2,524,871 | Andrus | Oct. 10, 1950 |

FOREIGN PATENTS

| Number | Country | Date |
|---|---|---|
| 2,501 | Great Britain | of 1862 |
| 325,034 | Italy | Feb. 26, 1935 |